(12) United States Patent
Shock et al.

(10) Patent No.: US 9,227,865 B2
(45) Date of Patent: Jan. 5, 2016

(54) METHODS AND SYSTEMS FOR MAKING WELL-FINED GLASS USING SUBMERGED COMBUSTION

(71) Applicant: JOHNS MANVILLE, Denver, CO (US)

(72) Inventors: Jeffrey M Shock, Castle Rock, CO (US); Aaron Morgan Huber, Castle Rock, CO (US)

(73) Assignee: Johns Manville, Denver, CO (US)

( * ) Notice: Subject to any disclaimer, the term of this patent is extended or adjusted under 35 U.S.C. 154(b) by 272 days.

(21) Appl. No.: 13/689,318

(22) Filed: Nov. 29, 2012

(65) Prior Publication Data

US 2014/0144185 A1 May 29, 2014

(51) Int. Cl.

| | |
|---|---|
| *C03B 5/20* | (2006.01) |
| *C03B 5/225* | (2006.01) |
| *C03B 5/235* | (2006.01) |
| *C03B 5/193* | (2006.01) |
| C03B 5/04 | (2006.01) |
| C03B 5/43 | (2006.01) |

(52) U.S. Cl.
CPC .................. *C03B 5/225* (2013.01); *C03B 5/193* (2013.01); *C03B 5/20* (2013.01); *C03B 5/205* (2013.01); *C03B 5/2356* (2013.01); *C03B 5/04* (2013.01); *C03B 5/43* (2013.01); *C03B 2211/22* (2013.01); *C03B 2211/23* (2013.01)

(58) Field of Classification Search
CPC ................................. C03B 5/20; C03B 5/2356
See application file for complete search history.

(56) References Cited

U.S. PATENT DOCUMENTS

| | | | |
|---|---|---|---|
| 2,174,533 | A | 10/1939 | See et al. |
| 2,269,459 | A | 1/1942 | Kleist |
| 2,432,942 | A | 12/1947 | See et al. |
| 3,170,781 | A | 2/1965 | Keefer |
| 3,237,929 | A | 3/1966 | Plumat et al. |
| 3,245,769 | A | 4/1966 | Eck et al. |

(Continued)

FOREIGN PATENT DOCUMENTS

| | | |
|---|---|---|
| DE | 10029983 A1 | 1/2002 |
| EP | 2 397 446 A2 | 12/2011 |

(Continued)

OTHER PUBLICATIONS

"Glass Technologies—The Legacy of a Successful Public-Private Partnership", 2007, U.S. Department of Energy, pp. 1-32.

(Continued)

*Primary Examiner* — Matthew Daniels
*Assistant Examiner* — Cynthia Szewczyk
(74) *Attorney, Agent, or Firm* — Robert D. Touslee

(57) ABSTRACT

Methods and systems produce a molten mass of foamed glass in a submerged combustion melter (SCM). Routing foamed glass to a fining chamber defined by a flow channel fluidly connected to and downstream of the SCM. The flow channel floor and sidewalls have sufficient glass-contact refractory to accommodate expansion of the foamed glass as fining occurs during transit through the fining chamber. The foamed glass is separated into an upper glass foam phase and a lower molten glass phase as the foamed glass flows toward an end of the flow channel distal from the SCM. The molten glass is then routed through a transition section fluidly connected to the distal end of the flow channel. The transition section inlet end construction has at least one molten glass inlet aperture, such that the inlet aperture(s) are positioned lower than the phase boundary between the upper and lower phases.

24 Claims, 7 Drawing Sheets

(56) References Cited

U.S. PATENT DOCUMENTS

| | | |
|---|---|---|
| 3,260,587 A | 7/1966 | Dolf et al. |
| 3,268,313 A | 8/1966 | Burgman et al. |
| 3,325,298 A | 6/1967 | Brown |
| 3,421,873 A | 1/1969 | Burgman et al. |
| 3,510,393 A | 5/1970 | Burgman et al. |
| 3,519,412 A | 7/1970 | Olink |
| 3,563,683 A | 2/1971 | Hess |
| 3,592,623 A | 7/1971 | Shepherd |
| 3,606,825 A | 9/1971 | Johnson |
| 3,617,234 A | 11/1971 | Hawkins et al. |
| 3,627,504 A | 12/1971 | Johnson et al. |
| 3,738,792 A | 6/1973 | Feng |
| 3,746,527 A | 7/1973 | Knavish et al. |
| 3,764,287 A | 10/1973 | Brocious |
| 3,771,988 A | 11/1973 | Starr |
| 3,885,945 A | 5/1975 | Rees et al. |
| 3,951,635 A | 4/1976 | Rough |
| 3,976,464 A | 8/1976 | Wardlaw |
| 4,004,903 A | 1/1977 | Daman et al. |
| 4,110,098 A | 8/1978 | Mattmuller |
| 4,185,982 A | 1/1980 | Schwenninger |
| 4,203,761 A | 5/1980 | Rose |
| 4,226,564 A | 10/1980 | Takahashi et al. |
| 4,282,023 A | 8/1981 | Hammel et al. |
| 4,303,435 A | 12/1981 | Sleighter |
| 4,309,204 A | 1/1982 | Brooks |
| 4,323,718 A | 4/1982 | Buhring et al. |
| 4,349,376 A | 9/1982 | Dunn et al. |
| 4,397,692 A | 8/1983 | Ramge et al. |
| 4,406,683 A | 9/1983 | Demarest |
| 4,432,780 A | 2/1984 | Propster et al. |
| 4,539,034 A | 9/1985 | Hanneken |
| 4,542,106 A | 9/1985 | Sproull |
| 4,632,687 A * | 12/1986 | Kunkle et al. ............... 65/27 |
| 4,634,461 A * | 1/1987 | Demarest et al. ............ 65/27 |
| 4,723,708 A | 2/1988 | Berger et al. |
| 4,735,642 A | 4/1988 | Jensen et al. |
| 4,738,938 A | 4/1988 | Kunkle et al. |
| 4,758,259 A | 7/1988 | Jensen |
| 4,816,056 A | 3/1989 | Tsai et al. |
| 4,886,539 A | 12/1989 | Gerutti et al. |
| 4,932,035 A * | 6/1990 | Pieper ........................ 373/32 |
| 5,011,086 A | 4/1991 | Sonnleitner |
| 5,052,874 A | 10/1991 | Johanson |
| 5,169,424 A | 12/1992 | Grinnen et al. |
| 5,405,082 A | 4/1995 | Brown et al. |
| 5,473,885 A | 12/1995 | Hunter, Jr. et al. |
| 5,613,994 A | 3/1997 | Muniz et al. |
| 5,713,668 A | 2/1998 | Lunghofer et al. |
| 5,718,741 A | 2/1998 | Hull et al. |
| 5,814,121 A | 9/1998 | Travis |
| 5,849,058 A | 12/1998 | Takeshita et al. |
| 5,887,978 A | 3/1999 | Lunghofer et al. |
| 5,944,864 A | 8/1999 | Hull et al. |
| 6,036,480 A | 3/2000 | Hughes et al. |
| 6,156,285 A | 12/2000 | Adams et al. |
| 6,210,703 B1 | 4/2001 | Novich |
| 6,244,197 B1 | 6/2001 | Coble |
| 6,274,164 B1 | 8/2001 | Novich |
| 6,314,760 B1 | 11/2001 | Chenoweth |
| 6,332,339 B1 | 12/2001 | Kawaguchi et al. |
| 6,344,747 B1 | 2/2002 | Lunghofer et al. |
| 6,460,376 B1 | 10/2002 | Jeanvoine et al. |
| 6,536,238 B2 | 3/2003 | Kawaguchi et al. |
| 6,578,779 B2 | 6/2003 | Dion |
| 6,715,319 B2 | 4/2004 | Barrow et al. |
| 6,739,152 B2 | 5/2004 | Jeanvoine et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 7,134,300 B2 | 11/2006 | Hayes et al. |
| 7,273,583 B2 | 9/2007 | Rue et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,448,231 B2 | 11/2008 | Jeanvoine et al. |
| 7,509,819 B2 | 3/2009 | Baker et al. |
| 7,565,819 B2 | 7/2009 | Jeanvoine et al. |
| 7,622,677 B2 | 11/2009 | Barberree et al. |
| 8,033,254 B2 | 10/2011 | Hannum et al. |
| 2002/0162358 A1 | 11/2002 | Jeanvoine et al. |
| 2004/0168474 A1 | 9/2004 | Jeanvoine et al. |
| 2004/0224833 A1 | 11/2004 | Jeanvoine et al. |
| 2006/0000239 A1 | 1/2006 | Jeanvoine et al. |
| 2006/0162387 A1 | 7/2006 | Schmitt et al. |
| 2007/0122332 A1 | 5/2007 | Jacques et al. |
| 2007/0212546 A1 | 9/2007 | Jeanvoine et al. |
| 2007/0220922 A1 | 9/2007 | Bauer et al. |
| 2008/0187686 A1 * | 8/2008 | Rodriguez Cuartas et al. ........................ 428/1.1 |
| 2008/0256981 A1 | 10/2008 | Jacques et al. |
| 2008/0276652 A1 | 11/2008 | Bauer et al. |
| 2009/0042709 A1 | 2/2009 | Jeanvoine et al. |
| 2011/0088432 A1 | 4/2011 | Purnode et al. |
| 2011/0308280 A1 | 12/2011 | Huber |
| 2012/0077135 A1 | 3/2012 | Charbonneau |

FOREIGN PATENT DOCUMENTS

| | | |
|---|---|---|
| EP | 2 433 911 A1 | 3/2012 |
| GB | 1449439 | 9/1976 |
| JP | 58199728 A | 11/1983 |
| WO | 2010011701 A2 | 1/2010 |

OTHER PUBLICATIONS

Rue, "Energy-Efficient Glass Melting—The Next Generation Melter", Gas Technology Institute, Project No. 20621 Final Report, 2008.
U.S. Appl. No. 12/817,754, filed Jun. 17, 2010, Huber.
U.S. Appl. No. 12/888,970, filed Sep. 23, 2010, Charbonneau.
U.S. Appl. No. 13/267,990, filed Oct. 7, 2011, Shock et al.
U.S. Appl. No. 13/268,028, filed Oct. 7, 2011, Charbonneau.
U.S. Appl. No. 13/268,065, filed Oct. 7, 2011, Charbonneau et al.
U.S. Appl. No. 13/268,098, filed Oct. 7, 2011, Huber et al.
U.S. Appl. No. 13/268,130, filed Oct. 7, 2011, Charbonneau et al.
U.S. Appl. No. 13/458,211, filed Apr. 27, 2012, Mobley et al.
U.S. Appl. No. 13/493,170, filed Jun. 11, 2012, Huber et al.
U.S. Appl. No. 13/493,219, filed Jun. 11, 2012, Charbonneau.
"Glass Industry of the Future", Sep. 30, 2008, United States Department of Energy, report 02-GA501 13-03, pp. 1-17.
Stevenson, "Foam Engineering: Fundamentals and Applications", Published 2012, Chapter 16, John Wiley & Sons, Ltd.
Clare et al., "Density and Surface Tension of Borate Containing Silicate Glass Melts", Glass Technology, 2003, 44(2), pp. 59-62.
Seward, T.P., "Modeling of Glass Making Processes for Improved Efficiency", DE-FG07-96EE41262, Final Report, Mar. 31, 2003.
Conradt et al, Foaming behaviour on glass melts, Glastechniche Berichte 60 (1987) Nr. 6, S. 189-201 Abstract Fraunhofer ISC.
Kim et al., "Foaming in Glass Melts Produced by Sodium Sulfate Decomposition under Isothermal Conditions", Journal of the American Ceramic Society, 1991, 74(3), pp. 551-555.
Kim et al., "Foaming in Glass Melts Produced by Sodium Sulfate Decomposition under Ramp Conditions", Journal of the American Ceramic Society, 1992, 75(11), pp. 2959-2963.
Kim et al., "Effect of Furnace Atmosphere on E-glass Foaming", Journal of Non-Crystalline Solids, 2006, 352(50/51), pp. 5287-5295.
Van Limpt, et al., "Modelling the evaporation of boron species, Alkali-free borosilicate glass melts", Glass Technology—European Journal of Glass Science and Technology, Part 1, Jun. 2011, 52(3), pp. 77-87.
U.S. Appl. No. 13/540,771, filed Jul. 3, 2012, Charbonneau et al.
U.S. Appl. No. 13/633,998, filed Oct. 3, 2012, Charbonneau et al.
U.S. Appl. No. 13/633,979, filed Oct. 3, 2012, Charbonneau et al.
U.S. Appl. No. 13/644,058, filed Oct. 3, 2012, Charbonneau et al.
U.S. Appl. No. 13/644,104, filed Oct. 3, 2012, Charbonneau et al.
U.S. Appl. No. 13/644,039, filed Oct. 3, 2012, Shock et al.

* cited by examiner

METHODS AND SYSTEMS FOR MAKING WELL-FINED GLASS USING SUBMERGED COMBUSTION

This application may be related to the following United States non-provisional patent applications assigned to the assignee of the present application which are all incorporated by reference herein: Ser. No. 12/817754, filed Jun. 17, 2010, now U.S. Pat. No. 8,769,992; Ser. Nos. 13/267990, 13/268028, 13/268098, and 13/268130, all four filed Oct. 7, 2011 (now U.S. Pat. Nos. 8,987,525, 8,875,544, 8,707,740, and 9,021,838, respectively); Ser. No. 13/458211, filed Apr. 27, 2012; Ser. Nos. 13/493170 and 13/493219, both filed Jun. 11, 2012; Ser. No. 13/540771, filed Jul. 3, 2012, now U.S. Pat. No. 9,032,760; Ser. Nos. 13/644058, 13/644104; 13/633979; 13/633998; and 13/644039, all five filed Oct. 3, 2012; and Ser. No. 13/752672, filed Jan. 29, 2013.

BACKGROUND OF THE INVENTION

The present disclosure relates generally to the field of submerged combustion melters and methods of use thereof to produce molten glass, and more specifically to methods and systems for making well-fined molten glass, and glass products therefrom, using one or more submerged combustion melters.

BACKGROUND ART

A submerged combustion melter (SCM) may be employed to melt glass batch and/or waste glass materials to produce molten glass by passing oxygen, oxygen-enriched mixtures, or air along with a liquid, gaseous and/or particulate fuel (some of which may be in the glass-forming materials), directly into a molten pool of glass, usually through burners submerged in a glass melt pool. The introduction of high flow rates of products of combustion of the oxidant and fuel into the molten glass, and the expansion of the gases cause rapid melting of the glass batch and much turbulence and foaming.

Molten glass produced from an SCM is generally a homogeneous mixture of molten glass and fine bubbles. The bubbles may occupy up to 40 percent or more of the volume of molten glass produced with fine bubbles distributed throughout the molten mass of glass. For glass forming operations requiring well-fined (essentially void free) molten glass, a very large number of bubbles must be removed from the molten glass. The typical procedure for removing the bubbles is to allow a long enough residence time in one or more apparatus downstream of the SCM for the bubbles to rise to the surface and burst. Clearing bubbles from the molten glass is referred to as "fining" within the glass industry. Experience with SCMs has shown that the fining process can be very slow due to the bubbles collecting at the molten glass surface forming a layer of stable foam thereon. Formation of this foam layer in downstream fining chambers retards the fining mechanism as well as the heat penetration into the glass from fining chamber heating systems, such as combustion burners firing above the glass and/or electrical joule heating below the glass.

Use of skimmers within the foam layer has been used to hold back some of the upper foam layers allowing the lower, less foamy layers to pass through to later sections of channels downstream of the SCM. These efforts have been somewhat effective but may require multiple skimmers to obtain a foam free glass layer and surface. In addition, the skimmers are prone to failure during operation making them no longer useful in holding back the upper foam layers and can fall into and partially block the channel impeding some or all of the glass flow to downstream apparatus such as forming stations. It is also conventional to use a submerged throat positioned between a melter and a downstream channel, or between first and second sections of a melter; however, these throats are used primarily to serve as a demarcation between an upstream melting region and a downstream fining region. In effect, there is no attempt to separate any bubbles from the molten mass using conventional throats.

At least for these reasons, it would be an advance in the glass manufacturing art using submerged combustion melters if the foamy upper glass layer or layers, and the glass foam layer floating thereon, could be removed or separated from the fined glass without using multiple skimmers, thereby allowing formation of well-fined molten glass, and glass products using the well-fined molten glass.

SUMMARY

In accordance with the present disclosure, systems and methods are described for and/or glass foam produced during submerged combustion melting of glass-forming materials in equipment downstream of a submerged combustion melter.

A first aspect of the disclosure is a method comprising:

melting glass-forming materials to produce a turbulent molten mass of foamed glass in a submerged combustion melter (SCM), the SCM comprising a roof, a floor, a sidewall structure connecting the roof and floor, and an outlet for the molten mass of foamed glass in the floor and/or the sidewall structure;

routing the molten mass of foamed glass through the SCM outlet to a fining chamber defined by a first flow channel fluidly connected to and downstream of the SCM, the first flow channel comprising at least a floor and a sidewall structure, the first flow channel having glass-contact refractory lining the floor and at least a portion of the flow channel sidewall structure to a height sufficient to accommodate expansion of the molten mass of foamed glass as fining occurs during transit through the fining chamber;

separating the molten mass of foamed glass into an upper phase consisting essentially of glass foam and a lower phase consisting essentially of molten glass as the molten mass of foamed glass flows toward an end of the first flow channel distal from the SCM; and routing the molten glass through a passage defined by a transition section fluidly connected to the distal end of the first flow channel, the transition section comprising a floor and a cover, the floor and cover connected by a sidewall structure, and comprising an inlet end structure and an outlet end structure, the inlet end structure comprising at least one molten glass inlet aperture and the outlet end structure comprising at least one molten glass outlet aperture, wherein all of the inlet apertures are positioned lower than a phase boundary between the upper and lower phases in the first flow channel.

A second aspect of the disclosure is a method comprising:

melting glass-forming materials to produce a turbulent molten mass of foamed glass in a submerged combustion melter (SCM), the SCM comprising a roof, a floor, a sidewall structure connecting the roof and floor, and an outlet for the molten mass of foamed glass in the floor and/or sidewall structure;

routing the molten mass of foamed glass through the SCM outlet to a fining chamber defined by a first flow channel fluidly connected to and downstream of the SCM, the first flow channel comprising at least a floor and a sidewall structure, the first flow channel having glass-contact refractory lining the floor and at least a portion of the first flow channel sidewall structure to a height sufficient to accommodate expansion of the molten mass of foamed glass as fining occurs during transit through the fining chamber;

separating the molten mass of foamed glass into an upper phase consisting essentially of glass foam and a lower phase consisting essentially of molten glass as the molten mass of foamed glass flows toward an end of the first flow channel distal from the SCM;

routing the molten glass through a passage defined by a transition section fluidly connected to the distal end of the first flow channel, the transition section comprising a floor and a cover, the floor and cover connected by a sidewall structure, and comprising an inlet end wall and an outlet end wall, the inlet end wall comprising at least one molten glass inlet aperture and the outlet end wall comprising at least one molten glass outlet aperture, wherein 100 percent of the inlet aperture is lower than the floor of the first flow channel; and routing the phase consisting essentially of molten glass through the outlet aperture of the end wall of the transition section to a temperature homogenizing chamber defined by a second flow channel fluidly connected to the outlet end wall of the transition section, the second flow channel comprising a geometry sufficient to form a temperature homogenized, well-fined molten glass.

A third aspect of the disclosure is a system comprising:

a submerged combustion melter (SCM) configured to form a turbulent molten mass of foamed glass by melting glass-forming materials therein, the SCM comprising a roof, a floor, a sidewall structure connecting the roof and floor, and a foamed glass outlet in the floor and/or the sidewall structure;

a first flow channel defining a fining chamber fluidly connected to and downstream of the SCM, the first flow channel comprising at least a floor and a sidewall structure, the first flow channel comprising glass-contact refractory at least lining the floor and at least a portion of the first flow channel sidewall structure to a height sufficient to accommodate expansion of the molten mass of foamed glass as fining occurs during transit of the molten mass of foamed glass through the fining chamber, the fining separating the molten mass of foamed glass into an upper phase consisting essentially of glass foam and a lower phase consisting essentially of molten glass as the molten mass of foamed glass flows toward an end of the first flow channel distal from the SCM; and a transition section defining a passage fluidly connected to the distal end of the first flow channel, the transition section comprising a floor and a cover, the floor and cover connected by a sidewall structure, and comprising an inlet end structure and an outlet end structure, the inlet end structure comprising at least one molten glass inlet aperture and the outlet end structure comprising at least one molten glass outlet aperture, wherein all of the inlet apertures are positioned lower than a phase boundary between the upper and lower phases in the first flow channel.

A fourth aspect of the disclosure is a system comprising:

a submerged combustion melter (SCM) configured to form a turbulent molten mass of foamed glass by melting glass-forming materials therein, the SCM comprising a roof, a floor, a sidewall structure connecting the roof and floor, and a foamed glass outlet in the floor and/or the sidewall structure;

a first flow channel defining a fining chamber fluidly connected to and downstream of the SCM, the first flow channel comprising at least a floor and a sidewall structure, the first flow channel comprising glass-contact refractory at least lining the floor and at least a portion of the first flow channel sidewall structure to a height sufficient to accommodate expansion of the molten mass of foamed glass as fining occurs during transit of the molten mass of foamed glass through the fining chamber, the fining separating the molten mass of foamed glass into an upper phase consisting essentially of glass foam and a lower phase consisting essentially of molten glass as the molten mass of foamed glass flows toward an end of the first flow channel distal from the SCM;

a transition section defining a passage fluidly connected to the distal end of the first flow channel, the transition section comprising a floor and a cover, the floor and cover connected by a sidewall structure, and comprising an inlet end wall and an outlet end wall, the inlet end wall comprising at least one molten glass inlet aperture and the outlet end wall comprising at least one molten glass outlet aperture, wherein 100 percent of the inlet aperture is lower than the floor of the first flow channel; and a second flow channel fluidly connected to the outlet end wall of the transition section and defining a temperature homogenizing chamber comprising a geometry sufficient to form a temperature homogenized well-fined molten glass using the phase consisting essentially of molten glass.

Systems and methods of this disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1:
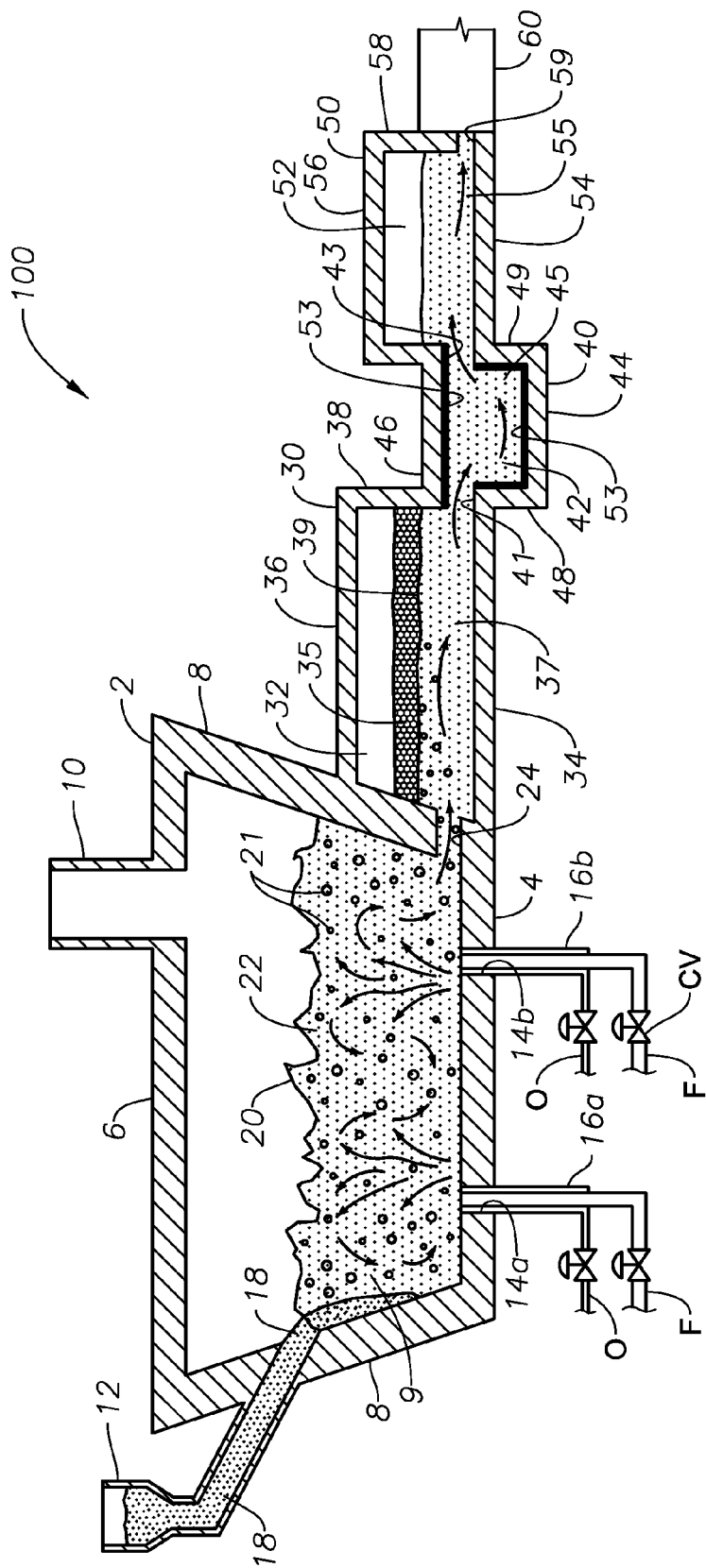
FIG. 1 is a schematic side elevation view, partially in cross-section, of one non-limiting system embodiment in accordance with the present disclosure.

It is to be noted, however, that the appended drawings of FIGS. 1-8 may not be to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed systems and methods. However, it will be understood by those skilled in the art that the systems and methods covered by the claims may be practiced without these details and that numerous variations or modifications from the specifically described embodiments may be possible and are deemed within the claims. All U.S. published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, bubbles may occupy up to 40 percent or more of the volume of the turbulent molten glass produced by an SCM, with fine bubbles distributed throughout the molten mass of glass. For glass forming operations requiring well-fined (essentially void free) molten glass, a very large number of bubbles must be removed from the molten glass. Experience with SCMs has shown that the fining process can be very slow due to the bubbles collecting at the molten glass surface forming a layer of stable foam thereon. Formation of this foam layer in downstream fining chambers retards the fining mechanism as well as the heat penetration into the glass from fining chamber heating systems, such as combustion burners firing above the glass and/or electrical joule heating below the glass. Use of skimmers within the foam layer to hold back some of the upper foam layers allowing the lower, less foamy layers to pass through to later sections of channels downstream of the SCM has been somewhat successful but suffers from several drawbacks.

It has been discovered that the use of a specially designed transition section in combination with a specially constructed fining chamber between the SCM and the transition section may fully accomplish separating fined glass from the foamy glass and/or glass foam floating thereon in a simple, effective way. The transition section may be fluidly connected to a second flow channel downstream of the transition section, the second flow channel defining a temperature conditioning or homogenization chamber for forming a well-fined, temperature homogenized molten glass. The transition section additionally is less likely to fail than a skimmer since it may have a robust construction and may be engineered for longevity in operation.

In accordance with methods and systems of the present disclosure, molten foamed glass leaving the SCM is routed to a refractory or refractory-lined flow channel of sufficient designed length and having sufficiently high glass contact refractory walls to accommodate the volume expansion that occurs during initial fining as the molten mass moves away from the SCM. The "high sidewalls" constructed of glass-contact refractory in the flow channel accommodate the glass foam surface rise resulting from the bubbles within the molten foamed glass rising to the surface creating the fined, essentially void-free glass in the lower layers. The length of the refractory or refractory-lined flow channel is such that a boundary layer is able to develop between the top-most foamy glass layers and the lower, essentially molten glass layers, as discussed herein.

Methods and systems of the present disclosure further include a refractory or precious metal-lined transition section fluidly connected to the distal end of the refractory or refractory-lined flow channel. In certain embodiments, at least 75 percent, in certain embodiments at least 90 percent, and in yet other embodiments 100 percent of the inlet to the transition section is positioned below a phase boundary between an upper phase consisting essentially of glass foam, and a lower phase consisting essentially of well-fined molten glass. In certain embodiments 100 percent of the inlet to the transition section is positioned relative to the refractory or refractory-lined flow channel so that only the lower, well-fined molten glass formed in the flow channel passes into and through the transition section, and further into one or more downstream temperature conditioning (sometimes referred to as a temperature homogenizing) flow channels. In certain embodiments the cover of the transition section (or the portion contacting molten glass) may be comprised of glass corrosion resistant material. In certain embodiments, the height of a roof of the refractory or refractory-lined flow channel is higher above the roof of the transition section compared to the height of the roof of the downstream temperature conditioning channel above the roof of the transition section, allowing a thick layer if foam to build up ahead of the transition section, and possibly be reduced or destroyed by impingement burners or other techniques, such as water spray, dripping water, and the like. In certain embodiments, the roof of the refractory or refractory-lined flow channel may slant upwards in the flow direction at an angle to horizontal, allowing entrapped bubbles to move upward and out of the molten glass stream flowing therein. In certain other embodiments, the roof of the transition section may slope upward in similar fashion.

The length, width, height, and depth dimensions of the passage defined by the transition section may vary widely, and may be designed to control glass temperature conditioning to help cool or heat the molten glass to close to the forming temperature, providing an additional temperature control of the glass delivery process. The width and depth may be constant or variable from the inlet end to the outlet end of the transition section.

In certain embodiments, the transition section outlet end structure may be configured so that the molten glass is allowed to well up into one or more downstream temperature conditioning channels, and further on to one or more glass forming stations or processes.

In certain embodiments the transition section may comprise one or more drains allowing removal of molten glass from the transition section, particularly in those embodiments where the transition section floor is positioned below the floor of structures upstream and downstream of the transition section.

In certain embodiments the transition section may include one or more Joule heating elements to maintain the molten glass in the liquid, molten state during times of low or no flow through the passage through the transition section, adding robustness to the methods and systems of the present disclosure to many planned and unplanned process conditions.

Various terms are used throughout this disclosure. "Submerged" as used herein means that combustion gases emanate from a combustion burner exit that is under the level of the molten glass, and "non-submerged" means that combustion gases do not emanate from combustion burner exits under the level of molten glass, whether in the SCM or downstream apparatus. Both submerged and non-submerged burners may be roof-mounted, floor-mounted, wall-mounted, or any combination thereof (for example, two floor mounted burners and one wall mounted burner). "SC" as used herein means "submerged combustion" unless otherwise specifically noted, and "SCM" means submerged combustion melter unless otherwise specifically noted.

The terms "foam" and "foamy" include froths, spume, suds, heads, fluffs, fizzes, lathers, effervesces, layer and the like. The term "bubble" means a thin, shaped, gas-filled film of molten glass. The shape may be spherical, hemispherical, rectangular, polyhedral, ovoid, and the like. The gas or "bubble atmosphere" in the gas-filled SC bubbles may comprise oxygen or other oxidants, nitrogen, combustion products (including but not limited to, carbon dioxide, carbon monoxide, $NO_x$, $SO_x$, $H_2S$, and water), reaction products of glass-forming ingredients (for example, but not limited to, sand (primarily $SiO_2$), clay, limestone (primarily $CaCO_3$), burnt dolomitic lime, borax and boric acid, and the like. Bubbles may include solids particles, for example soot particles, either in the film, the gas inside the film, or both. The term "glass foam" means foam where the liquid film comprises molten glass. "Glass level" means the distance measured from the bottom of a downstream apparatus to the upper liquid level of the molten glass, and "foam level" means the distance measured from the top of the atmosphere above the foam layer to the upper surface of the foam layer. "Foam height" (equivalent to foam thickness) is the distance measured between the glass level and foam level.

As used herein the term "combustion" means deflagration-type combustion unless other types of combustion are specifically noted, such as detonation-type combustion. Deflagration is sub-sonic combustion that usually propagates through thermal conductivity; hot burning material heats the next layer of cold material and ignites it. Detonation is supersonic and primarily propagates through shock. As used herein the terms "combustion gases" and "combustion products" means substantially gaseous mixtures of combusted fuel, any excess oxidant, and combustion products, such as oxides of carbon (such as carbon monoxide, carbon dioxide), oxides of nitrogen, oxides of sulfur, and water, whether from deflagration, detonation, or combination thereof. Combustion products may include liquids and solids, for example soot and unburned or non-combusted fuels.

"Oxidant" as used herein includes air and gases having the same molar concentrations of oxygen and nitrogen as air (synthetic air), oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facility, cylinders; or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

The term "flow channel" means a container, channel or conduit defined at least by a floor and a wall structure extending upwards from the floor to form a space in which molten glass may be present, whether flowing or not. In certain embodiments flow channels may include a roof and a wall structure connecting the floor and roof. The flow channels may have any operable cross-sectional shape (for example, but not limited to, rectangular, oval, circular, trapezoidal, hexagonal, and the like) and any flow path shape (for example, but not limited to, straight, zigzag, curved, and combinations thereof). Certain systems and methods comprise a first flow channel defining a fining chamber, and a second flow channel defining a conditioning channel. The phrase "the second flow channel comprising a geometry sufficient to form a temperature homogenized, well-fined molten glass" means that the second flow channel has length, width, and depth dimensions sufficient to provide the residence time adequate to form temperature homogenized, well-fined molten glass. The dimensions may be constant or changing from inlet to outlet of the second flow channel; generally, the depth is not so great as to require agitation of the melt to achieve temperature homogenization, although some agitation may be desired in certain embodiments. The length may also depend on the Reynolds number of the molten glass exiting the transition section. Higher Reynolds numbers may require longer second flow channels to achieve the desired temperature homogenization. As used herein the term "well-fined" means that in certain embodiments the molten glass has less than 15 bubbles per $cm^3$, or in some embodiments less than 2 bubbles per $cm^3$, or has a density within 95 percent of the density of the glass being produced with no bubbles, or in certain embodiments has a density within 99 percent of the density of the glass being produced with no bubbles.

SCMs, flow channels, transition sections and associated structures, as well as conduits used in burners and devices for delivery of compositions useful in systems and methods of the present disclosure may be comprised of metal, ceramic, ceramic-lined metal, or combination thereof. Suitable metals include stainless steels, for example, but not limited to, 306 and 316 steel, as well as titanium alloys, aluminum alloys, and the like. Suitable materials and thickness for the glass-contact refractory are discussed herein below. In any particular system and method, the flow channel geometry, transition section geometry, and associated structural features may be influenced by the type of glass being produced and degree of foaming.

Certain submerged and non-submerged combustion burners, certain components in and/or protruding through one or more of the floor, roof, and sidewall structure configured to heat or maintaining temperature of the foamed glass, in the SCM or otherwise, may be fluid-cooled, and in the case of burners may include first and second (or more) concentric conduits. In the case of burners, the first conduit may be fluidly connected at one end to a source of fuel, the second conduit may be fluidly connected to a source of oxidant, and a third substantially concentric conduit may connect to a source of cooling fluid.

Certain systems of this disclosure may comprise one or more non-submerged burners. Suitable non-submerged combustion burners may comprise a fuel inlet conduit having an exit nozzle, the conduit and nozzle inserted into a cavity of a ceramic burner block, the ceramic burner block in turn inserted into either the roof or the wall structure, or both the roof and wall structure of the downstream apparatus.

In certain systems, one or more burners may be adjustable with respect to direction of flow of the combustion products. Adjustment may be via automatic, semi-automatic, or manual control. Certain system embodiments may comprise a burner mount that mounts the burner in the wall structure, roof, or floor of the downstream apparatus comprising a refractory or refractory-lined ball joint or ball turret. Other burner mounts may comprise rails mounted in slots in the wall or roof. In yet other embodiments the burners may be mounted outside of the downstream apparatus, on supports that allow adjustment of the combustion products flow direction. Useable supports include those comprising ball joints, cradles, rails, and the like.

In certain systems and methods of the present disclosure, the flow channel may comprising a series of sections, and may comprise one or more impingement (high momentum) burners, such as described in assignee's U.S. application Ser. Nos. 13/268,130, filed Oct. 7, 2011, (now U.S. Pat. No. 9,021,838), and Ser. No. 13/493,170, filed Jun. 11, 2012(now U.S. Pat. No. 8,707,739). Certain systems and methods of the present disclosure may utilize measurement and control schemes such as described in assignee's co-pending application Ser. No. 13/493,219, filed Jun. 11, 2012, and/or feed batch densification systems and methods as described in assignee's co-pending application Ser. No. 13/540,704, filed Jul. 3, 2012. Certain systems and methods of the present disclosure may utilize one or more retractable devices for delivery of treating compositions such as disclosed in assignee's application Ser. No. 13/633,998, filed Oct. 3, 2012(now U.S. Pat. No. 8,973, 405). Certain systems and methods of the present disclosure may utilize one or more nozzles for delivery of treating compositions such as disclosed in assignee's co-pending application Ser. No. 13/644058, filed Oct. 3, 2012, and/or may utilize one or more foam destruction devices as described in assignee's co-pending application Ser. No. 13/644104, filed Oct. 3, 2012.

Certain systems and methods of this disclosure may be controlled by one or more controllers. For example, determination of molten foamed glass density gradient may be used to control one or more burners in the downstream apparatus and/or melter, level in a melter, feed rate to a melter, discharge rate of molten foamed glass from a melter, and other parameters. Burner (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain systems and methods of this disclosure may also use determined density gradient of molten foamed glass in the downstream apparatus to control feed rate of batch or other feed materials, such as glass batch, cullet, mat or wound roving and treatment compositions, to a melter; mass of feed to a melter, and the like. Exemplary systems and methods of the disclosure may comprise a controller which receives one or more input parameters selected from temperature of melt in a melter, density gradient in the downstream apparatus, composition of bubbles and/or foam, height of foam layer, glass level, foam level, and combinations thereof, and may employ a control algorithm to control combustion temperature, flow rate and/or composition of compositions to control foam decay rate and/or glass foam bubble size, and other output parameters based on one or more of these input parameters.

Specific non-limiting system and method embodiments in accordance with the present disclosure will now be presented in conjunction with the attached drawing figures. The same numerals are used for the same or similar features in the various figures. In the views illustrated in the drawing figures, it will be understood in the case of FIGS. 1-8 that the figures are schematic in nature, and certain conventional features may not be illustrated in all embodiments in order to illustrate more clearly the key features of each embodiment. The geometry of the flow channels is illustrated generally the same in the various embodiments, but that of course is not necessary.

Figure 2:
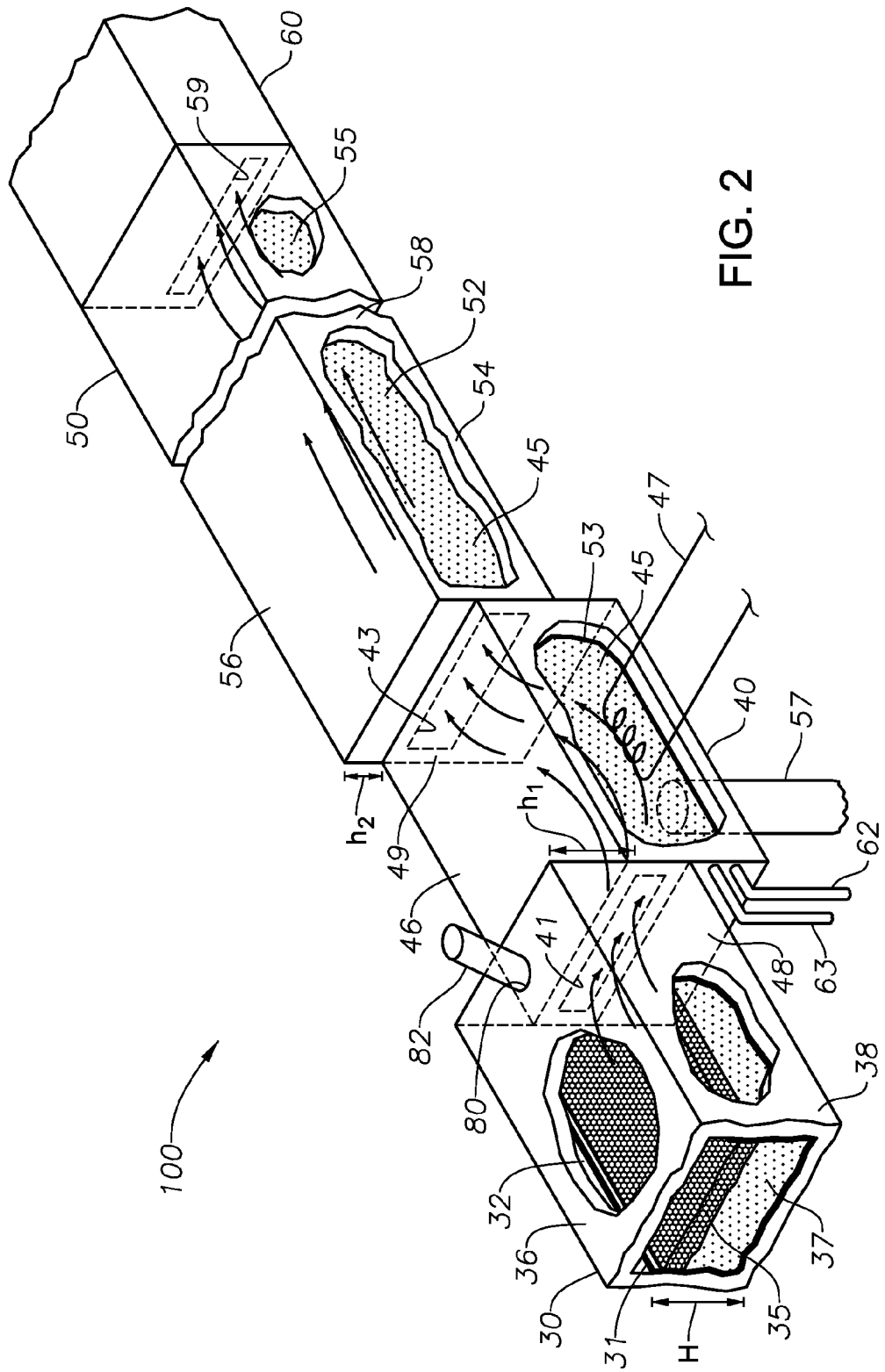
FIG. 2 is a schematic perspective view of a portion of the system embodiment of FIG. 1.

FIG. 1 is a schematic side elevation view, partially in cross-section, of one non-limiting system embodiment 100 in accordance with the present disclosure, and FIG. 2 is a schematic perspective view of a portion of system embodiment 100 of FIG. 1. The primary components of system embodiment 100 are an SCM 2, a first flow channel 30, a transition section 40, a second flow channel 50, and a glass delivery channel 60. SCM 2 includes a floor 4, a roof 6, and a sidewall structure 8 connecting floor 4 and roof 6. A first portion of sidewall structure 8 and roof 6 define a space 9 containing a turbulent molten mass of foamed glass 22 having a plurality of entrained bubbles 21, and a generally turbulent surface 20 created by flow of combustion products emanating from one or more submerged burners 16a, 16b, protruding through respective apertures 14a, 14b in SCM floor 4. Burners 16a, 16b may be sourced by oxidant "O" and fuel "F" as indicated in FIG. 1, controlled by one or more control valves "CV", all of which are not pointed out for sake of brevity. The curved arrows indicate general motion of molten glass in SCM 2. SCM 2 may further include a batch feeder 12 for feeding batch materials 18 through one or more feed apertures in SCM sidewall structure 8 (batch may also, or alternatively be fed through roof 6.) Other materials may be fed to SCM 2, as long as there is a significant portion of glass-forming materials or recycled glass. SCM 2 further includes one or more molten glass outlets 24, embodiment 100 illustrated as having outlet 24 in sidewall structure 8, but this is not necessary. SCM 2 further includes a stack 10.

Still referring to FIG. 1 and FIG. 2 as well, system embodiment 100 includes a first flow channel 30 fluidly connected to SCM 2. First flow channel 30 includes at least a floor 34 and a sidewall structure 38, and in embodiment 100 a roof 36 connected by sidewall structure 38 to flow channel floor 34. Roof 36 may not be present in all embodiments. First flow channel 30 defines a fining chamber 32 having a length configured so that as the mass of molten foamed glass 22 passes through SCM outlet 24 and traverses through fining chamber 32, the mass of molten foamy glass tends to separate into an upper phase 35 consisting essentially of glass foam, and a lower phase 37 consisting essentially of molten glass, and form a boundary 39 between upper phase 35 and lower phase 37. Because of the formation of upper foamy phase 35, first flow channel 30 in certain embodiments includes a higher than normal height "H" of glass-contact refractory 31, which may also be thicker than normal, say up to 3 inches (7.6 cm) or more thick, depending on the refractory corrosion rate, which depends largely on the glass composition being processed and temperatures.

Referring again to FIG. 1, transition section 40 of embodiment 100 includes a transition section floor 44, a roof or cover 46, an inlet end structure 48, and an outlet end structure 49, all defining a passage 42 through transition structure 40 for molten glass 45. As may be seen in the schematic of FIG. 1, molten glass in lower phase 37 is allowed to flow into transition section 40, through passage 42, but glass foam in upper phase 35 above boundary 39 is not. Inlet end structure 48 may include one or more apertures 41, and outlet end structure 49 may include one or more outlet apertures 43. In embodiment 100, inlet end structure 48 includes one slot aperture 41 and outlet end structure 49 includes one slot aperture 43. The shape of apertures 41, 43 are not especially important, although in certain embodiments they may have more advantageous configurations, as discussed further herein, however their position is critical. In embodiment 100, the entirety (100 percent) of inlet aperture or slot 41 is below boundary 39 between upper glass foam phase 35 and lower molten glass phase 37. As mentioned earlier, in certain embodiments it is not necessary that 100 percent of inlet aperture 41 be below boundary 39. Curved arrows indicate the general flow pattern of molten glass 45 through transition section 40. Glass foam in upper phase 35 is held back. Another important feature of transition section 40 is provision of a high temperature, corrosion-resistant, erosion-resistant lining 53; while not absolutely necessary, most embodiments of transition section 40 will comprise such a lining on at least some of the surfaces exposed to molten glass for system longevity. For example, certain embodiments may only have this lining on upper inside surfaces of the transition section, where the wear rate maybe the highest. High temperature materials for lining 53 may be platinum group metals or alloys thereof, such as platinum, rhodium, or platinum/rhodium alloy. Molybdenum and alloys thereof with other metals may also be used, as long as they meet temperature requirements.

Still referring to FIG. 1 and also FIG. 2, outlet end structure 49 of transition section 40 is fluidly connected to a second refractory or refractory-lined flow channel 50 having a floor 54, a roof 56, and a sidewall structure 58 including an outlet end aperture 59 through which molten glass 55 flows to a glass delivery channel 60. It is not necessary that second flow channel 50 have a lining of glass-contact refractory, but in order to increase run time of the system, such construction may be present in certain embodiments. Second flow channel 50 has a length sufficient to define a temperature conditioning or homogenizing chamber 52, in which molten glass 45 entering chamber 52 is conditioned into a molten glass of consistent temperature, 55, for downstream glass delivery channel 60 and further downstream glass forming operations.

FIG. 2 illustrates schematically certain optional features of systems within this disclosure, for example, provision of one or more electrical Joule heating elements 47, one or more cooling fluid source and return conduits, 62, 63 respectively, one or more controllable drain conduits 57 for transition section 40, and one or more apertures 80 in roof 36 of first flow channel 30 for various functions. One example may be provision of a vent 82, or a burner for directing foam away from transition section 40. Both high- and low-momentum burners have been described in other patent applications assigned to the assignee of the present application, and are further mentioned herein. FIG. 2 also illustrates that in embodiment 100, first flow channel roof 36 has a height $h_1$ above the cover 46 of transition section 40, and second flow channel roof 56 has a height $h_2$ above cover 46 of transition section 40, wherein $h_1 > h_2$, allowing for a thick layer of foam to build up in first flow channel 30. The height $h_1$ may be 1.2, or 1.5, or 2.0, or 3.0 times the height $h_2$, or more.

Figure 3:
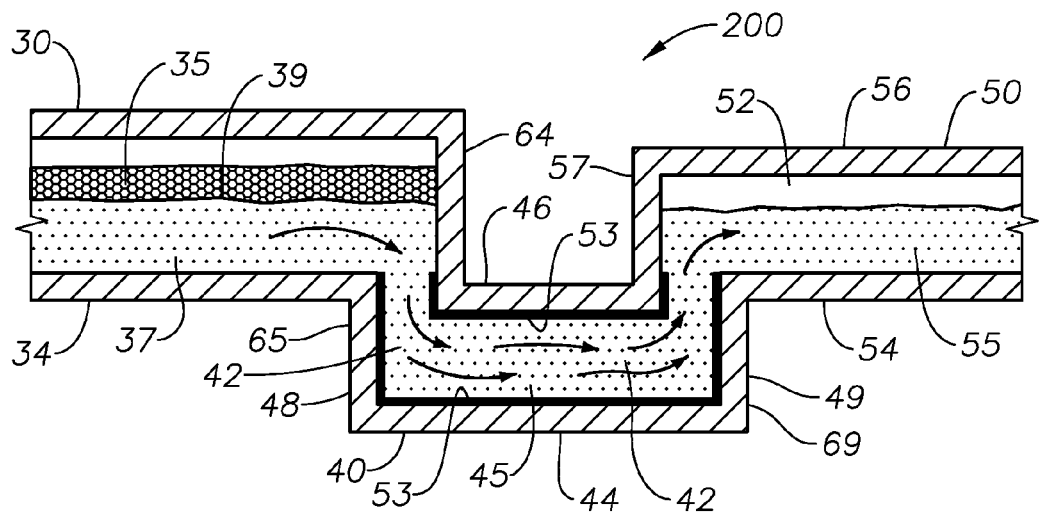
FIG. 3 is a schematic side elevation view, partially in cross-section, of a portion of another system embodiment in accordance with the present disclosure.
Figure 4:
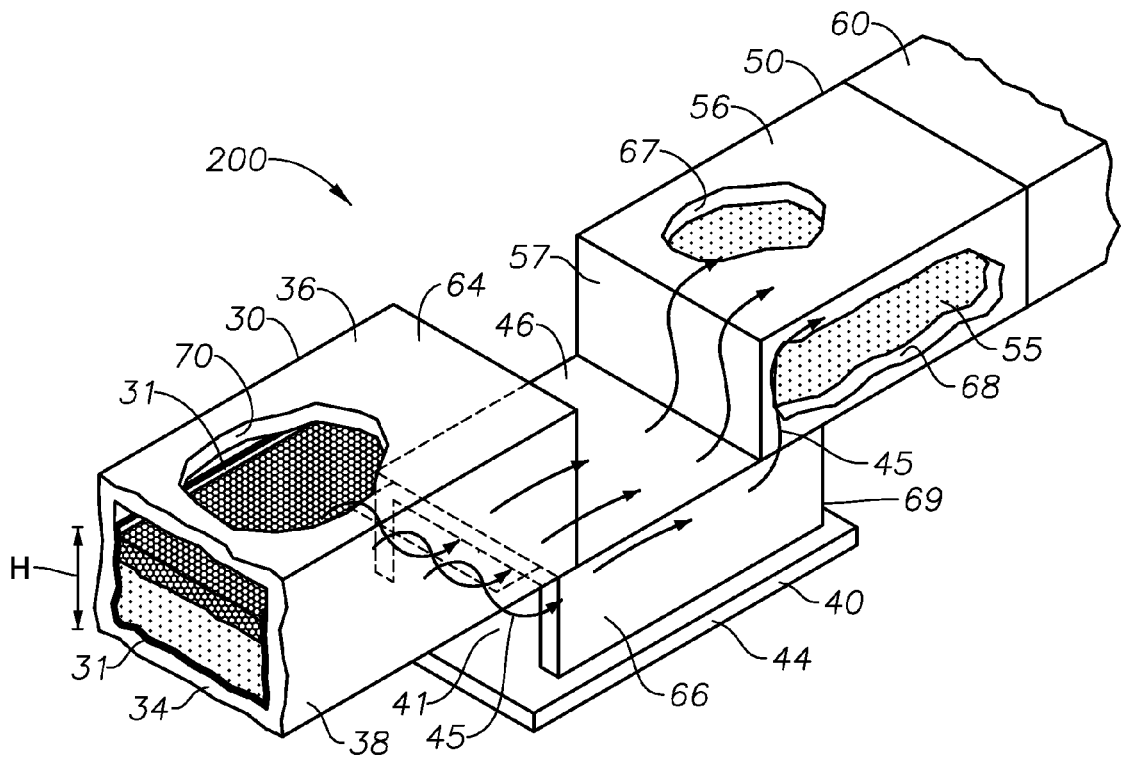
FIG. 4 is a schematic perspective view of the portion of the system embodiment of FIG. 3.

FIGS. 3 and 4 illustrate schematically system embodiment 200. Embodiment 200 differs from embodiment 100 primarily in the configuration of transition section 40. Transition section 40 in embodiment 200 also has a floor 44, roof or cover 46, inlet end structure 48 and outlet end structure 49, however in embodiment 200, roof or cover 46 and inlet end structure 48 are configured so that all of inlet aperture 41 is completely below floor 34 of first flow channel 30. Inlet end structure 48 further includes a top section 64, and a frontal section 65, which together with sidewalls 66 (only one being visible in FIG. 4) and floor 44 form a portion of flow passage 42 in this embodiment. Frontal section 65 is not illustrated in FIG. 4 for clarity. Similarly, a front end wall 57 of second flow channel 50 and a rearward section 69, along with floor 44 and sidewalls 66 form the exit end structure 49 in this embodiment. Corrosion-resistant, erosion-resistant lining 53 is also present and viewable in FIG. 3. Lining 53 in the various embodiments disclosed herein and like embodiments may have a thickness so as to provide a long run time for the systems of the disclosure. The thickness would not be more than necessary, but is technically limited only by the desired dimensions of the flow path of molten glass and footprint of the transition section. Lining 53 may in some embodiments be 0.5 inch (1.25 cm) thick or more if cost were no impediment, but typically may range from about 0.02 to about 0.1 inch (about 0.05 cm to about 0.25 cm). FIG. 4 also illustrates schematically one possible position of glass-contact refractory 31, viewable through a cutout portion 70. Glass-contact refractory 31 has a height "H", which would not be higher than necessary, and is dependent upon many factors, including the type (composition) of glass being processed. The height "H" may in fact be the entire height of the sidewall of first flow section 30. Also as viewable through cutouts 67 and 68, molten glass 45 flows though second flow channel 50, eventually forming temperature-conditioned molten glass 55 before being discharged into glass delivery channel 60.

Figure 5:
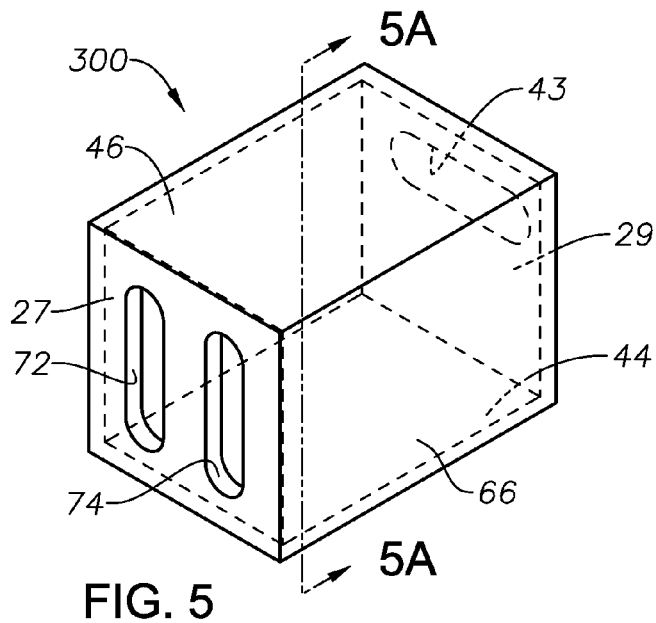
FIGS. 5 and 6 are schematic perspective views of two alternative embodiments of transition sections in accordance with the present disclosure.
Figure 5A:
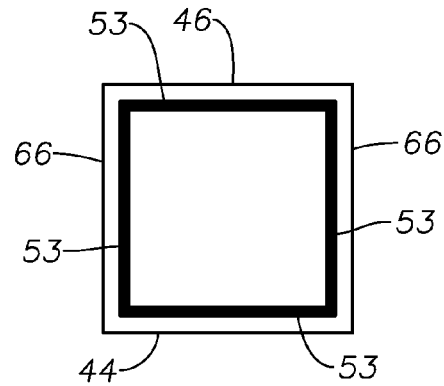
FIG. 5A is a cross-sectional view of the transition section schematically illustrated in FIG. 5.
Figure 5B:
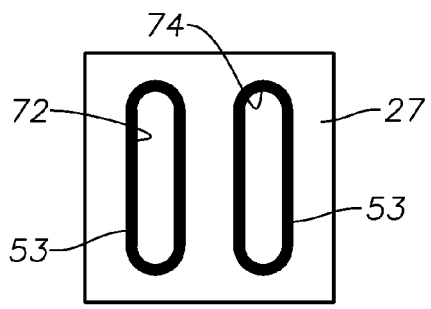
FIG. 5B is a more detailed view of the inlet end of the transition section of FIG. 5.
Figure 6:
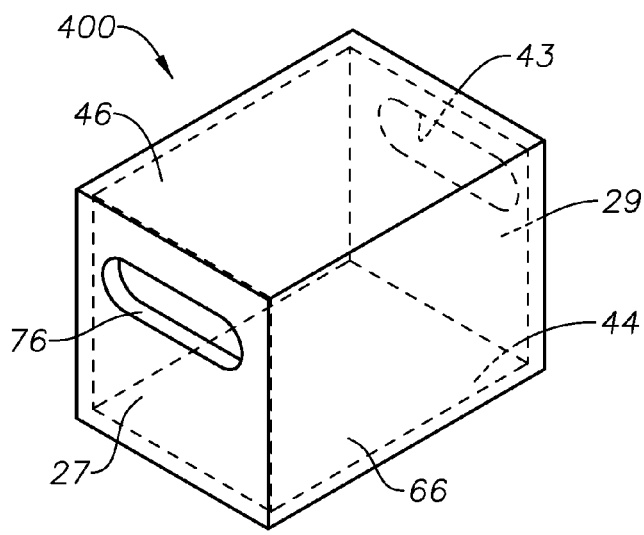

FIGS. 5 and 6 are schematic perspective views of two alternative embodiments of transition sections in accordance with the present disclosure. Embodiment 300 includes a pair of generally vertical oval or oblong-shaped inlet apertures 72, 74 in an inlet wall 27, and a generally horizontal oval or oblong-shaped outlet aperture 43 in an outlet wall 29. FIG. 5A is a cross-sectional view of transition section embodiment 300 schematically illustrated in FIG. 5, illustrating schematically precious metal lining 53, and FIG. 5B is a more detailed view of the inlet end of transition section embodiment 300, illustrating position of precious metal lining 53 in apertures 72, 74. In embodiment 400, illustrated schematically in FIG. 6, inlet aperture 76 is a generally oval or oblong-shaped opening in inlet wall 27, as is outlet end aperture 43 in outlet wall 29.

Figure 7:
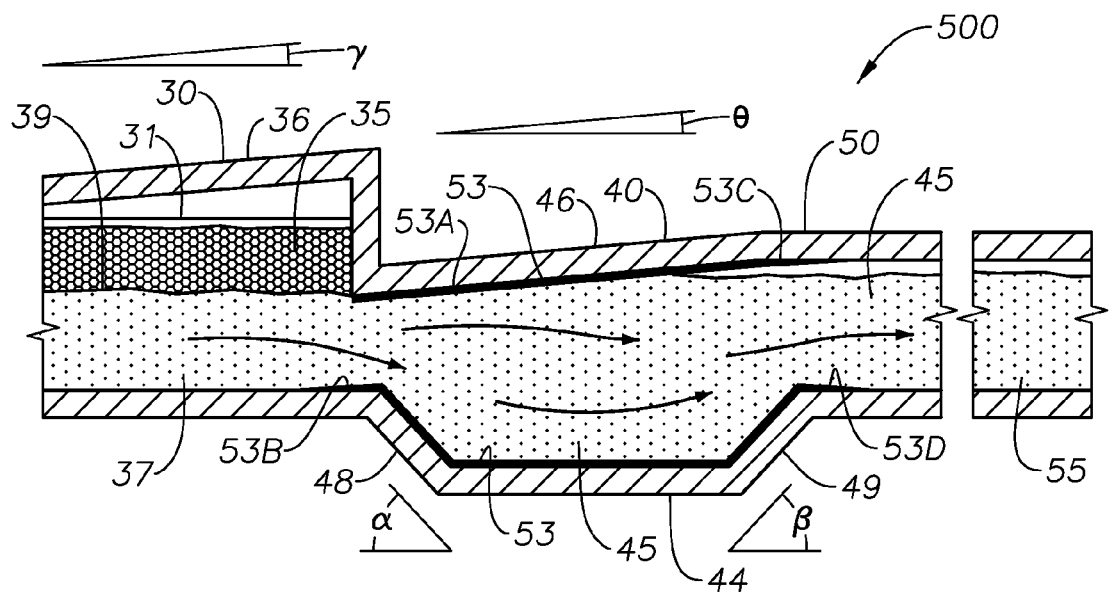
FIG. 7 is a longitudinal cross-sectional view of a portion of another system embodiment in accordance with the present disclosure.

FIG. 7 is a longitudinal cross-sectional view of a portion of another system embodiment 500 in accordance with the present disclosure. Embodiment 500 emphasizes that certain embodiments may include shaped, streamlined inlet and outlet end structures 48, 49. In embodiment 500, inlet end structure 48 includes a bottom that may be angled at an angle "α" to horizontal, while outlet end structure 49 includes a bottom portion that may be angled at an angle "β" to horizontal. Angles "α" and "β" may independently range from about 15 to about 90 degrees, or from about 25 to about 75 degrees, or from about 35 to about 55 degrees. These angles may also allow streamlining of the precious metal lining 53, as indicated at 53A, 53B, 53C, and 53D, and therefore the flow of molten glass 45. 29. Embodiment 500 also illustrates that first flow channel roof 36 may slant upward in the flow direction at an angle "γ" to horizontal, and that transition section cover 46 may slant upward in the flow direction at an angle "θ" to horizontal. Angles "γ" and "θ" may be the same or different, and each may independently range from about 5 to about 60 degrees, or from about 15 to about 55 degrees, or from about 35 to about 55 degrees.

Figure 8:
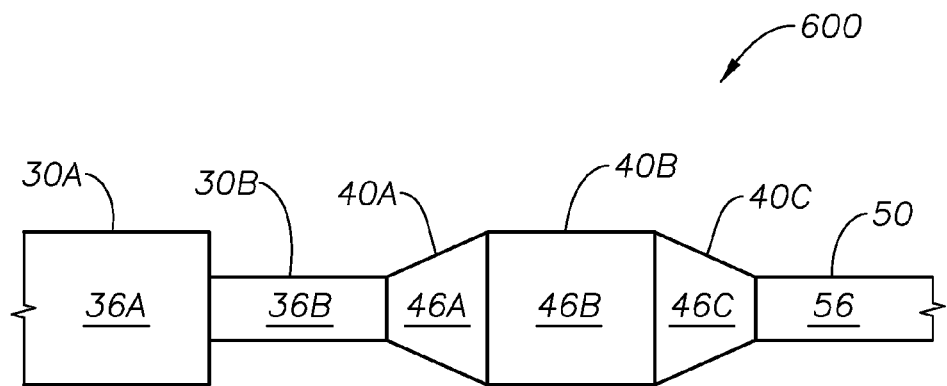
FIG. 8 is a plan view of a portion of another system embodiment in accordance with the present disclosure.

FIG. 8 is a plan view of a portion of another system embodiment 600 in accordance with the present disclosure, emphasizing that first flow channel 30 may actually be comprised of one or more flow channels, for example sub-channels 30A, 30B as illustrated. Similarly, transition section 40 may be comprised of one or more transition sub-sections, for example a first widening sub-section 40A, fluidly connected to a sub-section 40B of constant width, which in turn is fluidly connected to a narrowing width sub-section 40C. The various sub-sections 40A, 40B, and 40C may have respective covers 46A, 46B, and 46C. It should be noted that, although not illustrated, the various sub-sections 40A, 40B, and 40C need not have the same depth.

Figure 9:
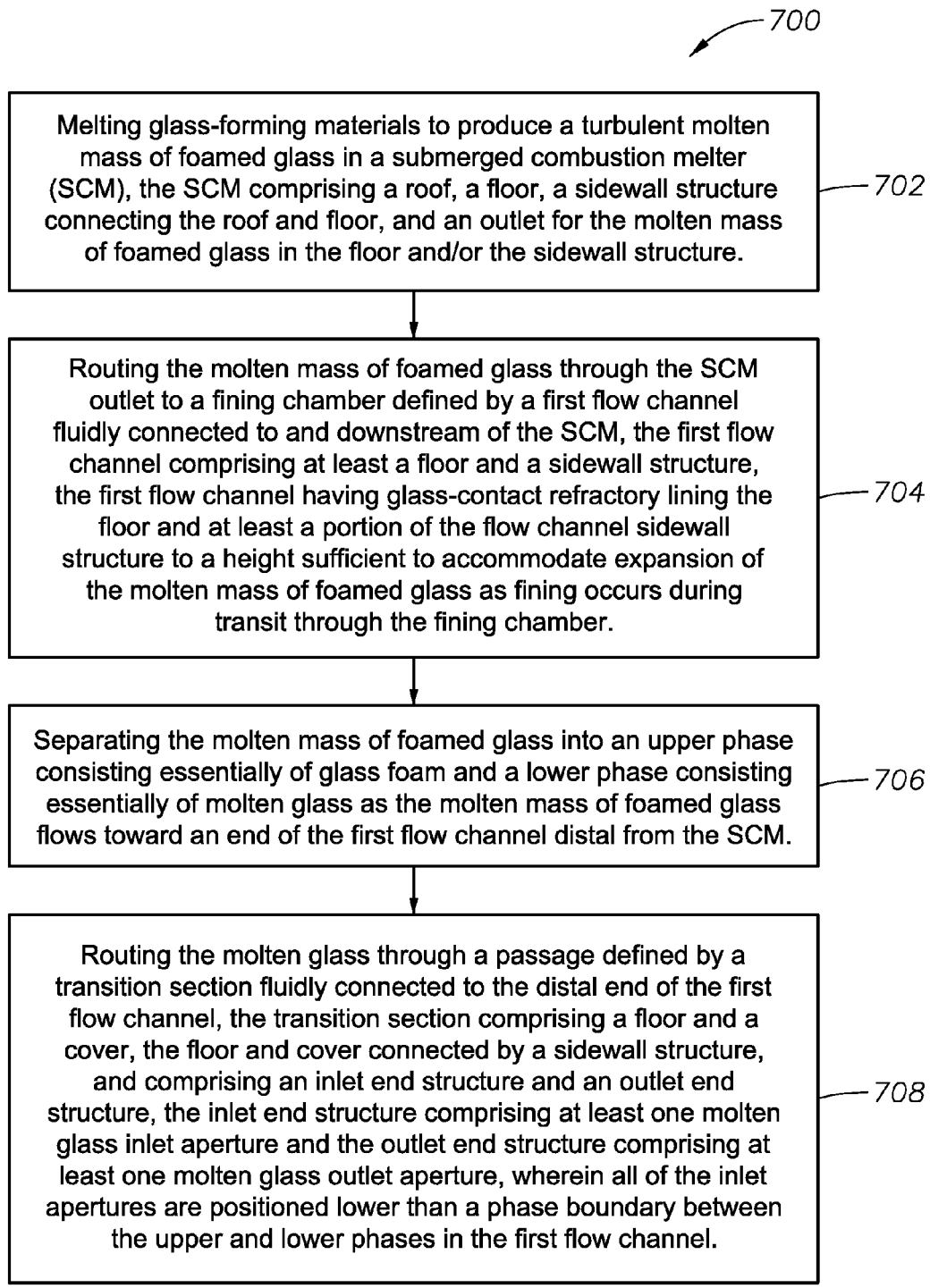
FIGS. 9 and 10 are logic diagrams of two methods in accordance with the present disclosure.
Figure 10:
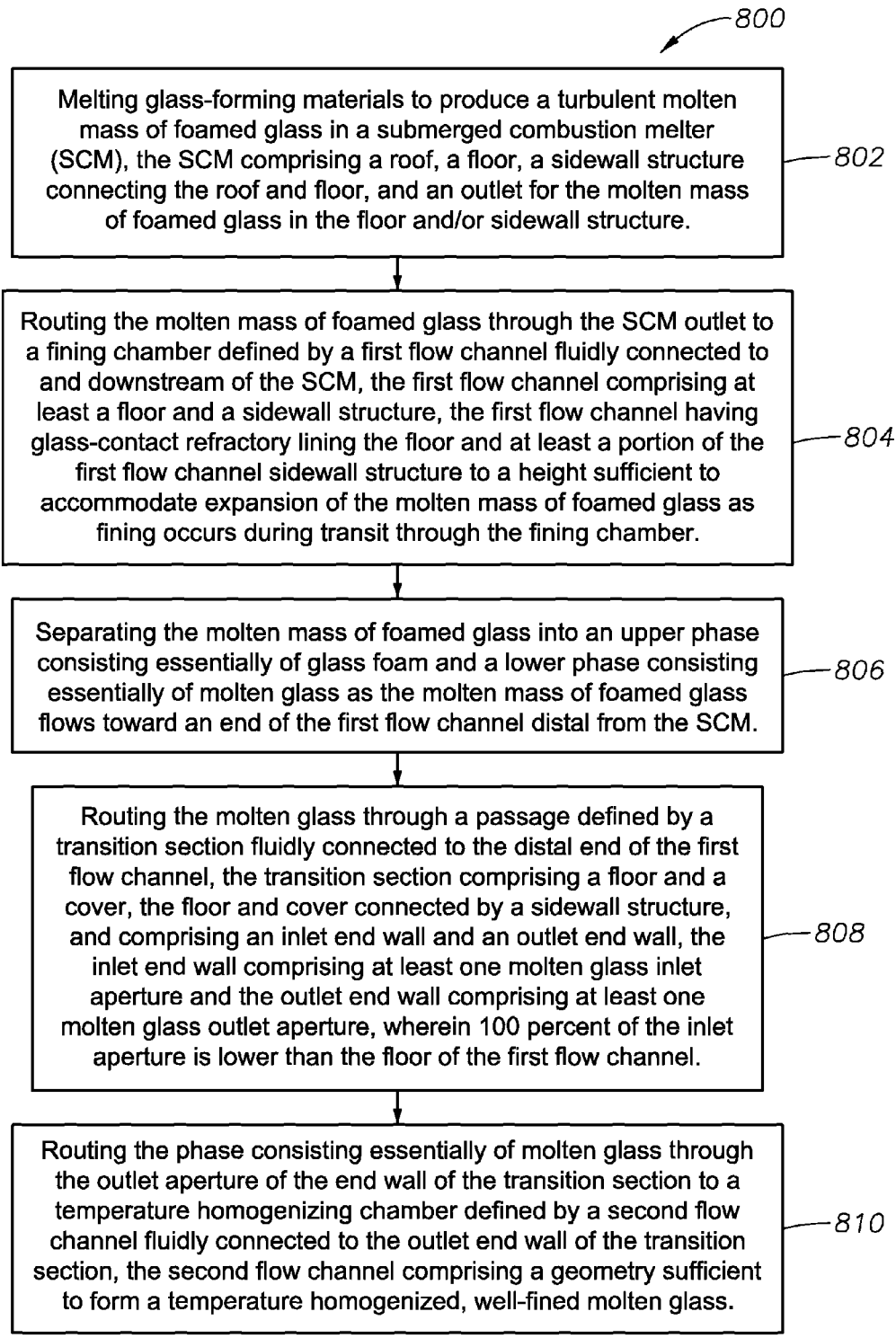

FIGS. 9 and 10 are logic diagrams of two methods in accordance with the present disclosure. Method embodiment 700 comprises melting glass-forming materials to produce a turbulent molten mass of foamed glass in an SCM, the SCM comprising a roof, a floor, a sidewall structure connecting the roof and floor, and an outlet for the molten mass of foamed glass in the floor and/or the sidewall structure (box 702). Method embodiment 700 further comprises routing the molten mass of foamed glass through the SCM outlet to a fining chamber defined by a first flow channel fluidly connected to and downstream of the SCM, the first flow channel comprising at least a floor and a sidewall structure, the first flow channel having glass-contact refractory lining the floor and at least a portion of the flow channel sidewall structure to a height sufficient to accommodate expansion of the molten mass of foamed glass as fining occurs during transit through the fining chamber (box 704). Method embodiment 700 further comprises separating the molten mass of foamed glass into an upper phase consisting essentially of glass foam and a lower phase consisting essentially of molten glass as the molten mass of foamed glass flows toward an end of the first flow channel distal from the SCM (box 706). Method embodiment 700 further comprises routing the molten glass through a passage defined by a transition section fluidly connected to the distal end of the first flow channel, the transition section comprising a floor and a cover, the floor and cover connected by a sidewall structure, and comprising an inlet end structure and an outlet end structure, the inlet end structure comprising at least one molten glass inlet aperture and the outlet end structure comprising at least one molten glass outlet aperture, wherein all of the inlet apertures are positioned lower than a phase boundary between the upper and lower phases in the first flow channel (box 708).

Method embodiment 800 comprises melting glass-forming materials to produce a turbulent molten mass of foamed glass in an SCM, the SCM comprising a roof, a floor, a sidewall structure connecting the roof and floor, and an outlet for the molten mass of foamed glass in the floor and/or sidewall structure (box 802). Method embodiment 800 further comprises routing the molten mass of foamed glass through the SCM outlet to a fining chamber defined by a first flow channel fluidly connected to and downstream of the SCM, the first flow channel comprising at least a floor and a sidewall structure, the first flow channel having glass-contact refractory lining the floor and at least a portion of the first flow channel sidewall structure to a height sufficient to accommodate expansion of the molten mass of foamed glass as fining occurs during transit through the fining chamber (box 804). Method embodiment 800 further comprises separating the molten mass of foamed glass into an upper phase consisting essentially of glass foam and a lower phase consisting essentially of molten glass as the molten mass of foamed glass flows toward an end of the first flow channel distal from the SCM (box 806). Method embodiment 800 further comprises routing the molten glass through a passage defined by a transition section fluidly connected to the distal end of the first flow channel, the transition section comprising a floor and a cover, the floor and cover connected by a sidewall structure, and comprising an inlet end wall and an outlet end wall, the inlet end wall comprising at least one molten glass inlet aperture and the outlet end wall comprising at least one molten glass outlet aperture, wherein 100 percent of the inlet aperture is lower than the floor of the first flow channel (box 808). Method embodiment 800 further comprises routing the phase consisting essentially of molten glass through the outlet aperture of the end wall of the transition section to a temperature homogenizing chamber defined by a second flow channel fluidly connected to the outlet end wall of the transition section, and forming a temperature homogenized molten glass (box 810).

In certain embodiments, as will be understood, the shape of the roof or cover, floor, and sidewall structure of various components described herein, as well as the location of the level or height of molten foamed or unfoamed glass, the amount of entrained bubbles, and amount of bubbles in foam layers, size of first and second flow channels and transition sections may vary widely.

In certain embodiments one or more SC burners may be oxy/fuel burners combusting fuel "F" with an oxygen-enriched oxidant "O". Turbulence created by SC burners in molten foamed glass 22 is indicated schematically in FIG. 1 by curved flow lines, single-headed arrows, and rolling surface 20. The exits of SC burners 16 may be flush with SCM floor 4, or may protrude slightly into SCM 2. SC burners 16*a*, 16*b* may have one or more companion burners spaced transversely therefrom (not shown). SC burners may be placed randomly or non-randomly to protrude through floor 4 and/or sidewall structure 8. SCM 2 may receive numerous feeds through one or more inlet ports, and batch feeders maybe provided. Other feeds are possible, such as glass mat waste, wound roving, waste materials, and the like, such as disclosed in assignee's U.S. application Ser. No. 12/888,970, filed Sep. 23, 2010(now U.S. Pat. No. 8,650,914). Oxidant, fuels, and other fluids may be supplied from one or more supply tanks or containers which are fluidly and mechanically connected to the SCM or flow channels or transition section via one or more conduits, which may or may not include flow control valves. One or more of the conduits may be flexible metal hoses, but they may also be solid metal, ceramic, or ceramic-lined metal conduits. Any or all of the conduits may include a flow control valve, which may be adjusted to shut off flow through a particular conduit. Those of skill in this art will readily understand the need for, and be able to construct suitable fuel supply conduits and oxidant supply conduits, as well as respective flow control valves, threaded fittings, quick connect/disconnect fittings, hose fittings, and the like.

In systems and methods employing glass batch as feed, such as embodiment 100 of FIGS. 1 and 2, one or more hoppers 12 containing one or more particles or particulate matter 18 may be provided. One or more hoppers may route particles through the SCM roof, through an SCM sidewall, or through both, through various apertures. While it is contemplated that particulate will flow merely by gravity from the hoppers, and the hoppers need not have a pressure above the solids level, certain embodiments may include a pressurized headspace above the solids in the hoppers. In embodiments, the teachings of assignee's co-pending application Ser. No. 13/540704, filed Jul. 3, 2012, describing various screw-feeder embodiments, and teaching of feed material compaction may be useful. One or more of the hoppers may include shakers or other apparatus common in industry to dislodge overly compacted solids and keep the particles flowing. Furthermore, each hopper will have a valve other apparatus to stop or adjust flow of particulate matter into the downstream apparatus. These details are not illustrated for sake of brevity.

Certain systems and methods of the present disclosure may be combined with strategies for foam de-stabilization. For example, adding nitrogen as a treating composition to the molten mass of glass and bubbles in the first flow channel 30 may tend to make bubbles in upper glass foam phase 35 less stable when there is the presence of a high moisture atmosphere in the first flow channel. A high moisture atmosphere may exist for example when one or more high momentum burners (whether oxy/fuel or not) are used as impingement burners in the first flow channel to impinge on upper glass foam phase 35. The use of one or more high momentum impingement burners (whether oxy/fuel or not) in a flow channel is described in assignee's U.S. application Ser. No. 13/493,170, filed Jun. 11, 2012(now U.S. Pat. No. 8,707,739).

The glass delivery channel 60 may include, or lead well-fined molten glass 55 to, one or more glass forming or production systems, for example bushings when producing glass fiber. The flow channels may be rectangular as illustrated in the various figures, or may be a shape such as a generally U-shaped or V-shaped channel or trough of refractory material supported by a metallic superstructure.

The flow rate of the molten glass through the first and second flow channels and transition section there between will depend on many factors, including the geometry and size of the SCM and downstream apparatus, temperature of the melt, viscosity of the melt, and like parameters, but in general the flow rate of molten glass may range from about 0.5 lb./min to about 5000 lbs./min or more (about 0.23 kg/min to about 2300 kg/min or more), or from about 10 lbs./min to about 500 lbs./min (from about 4.5 kg/min to about 227 kg/min), or from about 100 lbs./min to 300 lbs./min (from about 45 kg/min to about 136 kg/min).

second to about 40 ft./second (about 2 meters/second to about 12 meters/second).

SCMs may be fed a variety of feed materials. In SCMs processing glass batch, the initial raw material may include any material suitable for forming molten glass such as, for example, limestone, glass, sand, soda ash, feldspar and mixtures thereof. A glass composition for producing glass fibers known as "E-glass" typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in assignee's published U.S. applications 20070220922 and 20080276652. The initial raw material to provide these glass compositions can be calculated in known manner from the desired concentrations of glass components, molar masses of glass components, chemical formulas of batch components, and the molar masses of the batch components. Typical E-glass batches include those reproduced in Table 1, borrowed from the 2007/0220922 application. Notice that during glass melting, carbon dioxide (from lime) and water (borax) evaporate. The initial raw material can be provided in any form such as, for example, relatively small particles.

TABLE 1

Typical E-glass batches

| Raw material | A Limestone (Baseline) | B Quick-lime | C Ca Silicate | D Volcanic Glass | E Ca Silicate & Volcanic Glass | F Quartz-free #1 | G Quartz-free #2 | H Limestone Slag | I Ca Silicate Slag | J Quartz-free #3 | K Quartz and Clay Free | L Ca Silicate/ Feldspar |
|---|---|---|---|---|---|---|---|---|---|---|---|---|
| Quartz (flint) | 31.3% | 35.9% | 15.2% | 22.6% | 8.5% | 0% | 0% | 22.3% | 5.7% | 0% | 0% | 19.9% |
| Kaolin Clay | 28.1% | 32.3% | 32.0% | 23.0% | 28.2% | 26.4% | 0% | 22.7% | 26.0% | 26.0% | 0% | 0% |
| BD Lime | 3.4% | 4.3% | 3.9% | 3.3% | 3.8% | 3.7% | 4.3% | 2.8% | 3.1% | 3.1% | 4.3% | 4.4% |
| Borax | 4.7% | 5.2% | 5.2% | 0% | 1.5% | 0% | 0% | 0% | 0% | 0% | 1.1% | 1.1% |
| Boric Acid | 3.2% | 3.9% | 3.6% | 7.3% | 6.9% | 8.2% | 8.6% | 7.3% | 8.2% | 8.2% | 7.7% | 7.8% |
| Salt Cake | 0.2% | 0.2% | 0.2% | 0.2% | 0.2% | 0.2% | 0.2% | 0.2% | 0.2% | 0.2% | 0.2% | 0.2% |
| Limestone | 29.1% | 0% | 0% | 28.7% | 0% | 0% | 0% | 27.9% | 0% | 0% | 0% | 0% |
| Quicklime | 0% | 18.3% | 0% | 0% | 0% | 0% | 0% | 0% | 0% | 0% | 0% | 0% |
| Calcium Silicate | 0% | 0% | 39.9% | 0% | 39.1% | 39.0% | 27.6% | 0% | 37.9% | 37.9% | 26.5% | 26.6% |
| Volcanic Glass | 0% | 0% | 0% | 14.9% | 11.8% | 17.0% | 4.2% | 14.7% | 16.8% | 16.8% | 0% | 0% |
| Diatomaceous Earth (DE) | | | | | | 5.5% | 17.4% | 0% | 0% | 5.7% | 20.0% | 0% |
| Plagioclase Feldspar | | | | | | 0% | 38.3% | 0% | 0% | 0% | 40.1% | 40.1% |
| Slag | | | | | | 0% | 0% | 2.0% | 2.0% | 2.0% | 0% | 0% |
| Total | 100% | 100% | 100% | 100% | 100% | 100% | 100% | 100% | 100% | 100% | 100% | 100% |
| Volume of $CO_2$@ 1400 C. | 1668 | 0 | 0 | 1647 | 0 | 0 | 0 | 1624 | 0 | 0 | 0 | 0 |

Certain embodiments may use low momentum burners for heat and/or foam de-stabilization in flow channels 30 and/or 50, and/or transition section 40. Low momentum burners useful in systems and methods of this disclosure may include some of the features of those disclosed in assignee's U.S. patent application Ser. No. 13/268,130, filed Oct. 7, 2011 (now U.S. Pat. No. 9,021,838). For low momentum burners using natural gas as fuel, the burners may have a fuel firing rate ranging from about 0.4 to about 40 scfh (from about 11 L/hr. to about 1,120 L/hr.); an oxygen firing rate ranging from about 0.6 to about 100 scfh (from about 17 L/hr. to about 2,840 L/hr.); a combustion ratio ranging from about 1.5 to about 2.5; nozzle velocity ratio (ratio of velocity of fuel to oxygen at the fuel nozzle tip) ranging from about 0.5 to about 2.5; a fuel velocity ranging from about 6 ft./second to about 40 ft./second (about 2 meters/second to about 12 meters/second) and an oxidant velocity ranging from about 6 ft./

SCMs may also be fed by one or more roll stands, which in turn supports one or more rolls of glass mat, as described in assignee's U.S. application Ser. No. 12/888,970, filed Sep. 23, 2010(now U.S. Pat. No. 8,650,914), incorporated herein by reference. In certain embodiments powered nip rolls may include cutting knives or other cutting components to cut or chop the mat (or roving, in those embodiments processing roving) into smaller length pieces prior to entering the SCM. Also provided in certain embodiments may be a glass batch feeder. Glass batch feeders are well-known in this art and require no further explanation.

Flow channels, transition sections and SCMs may include refractory fluid-cooled panels. Liquid-cooled panels may be used, having one or more conduits or tubing therein, supplied with liquid through one conduit, with another conduit discharging warmed liquid, routing heat transferred from inside the melter to the liquid away from the melter. Liquid-cooled panels may also include a thin refractory liner, which minimizes heat losses from the melter, but allows formation of a thin frozen glass shell to form on the surfaces and prevent any refractory wear and associated glass contamination. Other useful cooled panels include air-cooled panels, comprising a conduit that has a first, small diameter section, and a large diameter section. Warmed air transverses the conduits such that the conduit having the larger diameter accommodates expansion of the air as it is warmed. Air-cooled panels are described more fully in U.S. Pat. No. 6,244,197. In certain embodiments, the refractory fluid cooled-panels may be cooled by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids that may be organic, inorganic, or some combination thereof, for example, salt solutions, glycol solutions, oils and the like. Other possible heat transfer fluids include steam (if cooler than the item to be cooled), carbon dioxide, or mixtures thereof with nitrogen. Heat transfer fluids may be compositions comprising both gas and liquid phases, such as the higher chlorofluorocarbons.

Certain embodiments may comprise a method control scheme for one or more flow channels, transition section, and/or SCM. For example, as explained in the '970 application, a master method controller may be configured to provide any number of control logics, including feedback control, feed-forward control, cascade control, and the like. The disclosure is not limited to a single master method controller, as any combination of controllers could be used. The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to one or more control elements, and/or to local devices associated with control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules. The controller may utilize Model Predictive Control (MPC) or other advanced multivariable control methods used in multiple input/multiple output (MIMO) systems. As mentioned previously, the methods of assignee's application Ser. No. 13/268,065, filed Oct. 7, 2011(now U.S. Pat. No. 8,973,400), using the vibrations and oscillations of the SCM itself, may prove useful predictive control inputs.

Glass-contact refractory lining for the first flow channel (and other equipment if desired) may be 3 inches, 4 inches, 5 inches or more (8 cm, 10 cm, or 13 cm or more) in thickness, however, greater thickness may entail more expense without resultant greater benefit. The refractory lining may be one or more layers. Glass-contact refractory used in flow channels described herein may be fused cast materials based on AZS (alumina-zirconia-silica), $\alpha/\beta$ alumina, zirconium oxide, chromium oxide, chrome corundum, so-called "dense chrome", and the like. One "dense chrome" material is available from Saint Gobain under the trade name SEFPRO, such as C1215 and C1221. Other useable "dense chrome" materials are available from the North American Refractories Co., Cleveland, Ohio (U.S.A.) under the trade designations SERV 50 and SERV 95. Other suitable materials for components that require resistance to high temperatures are fused zirconia ($ZrO_2$), fused cast AZS (alumina-zirconia-silica), rebonded AZS, or fused cast alumina ($Al_2O_3$). The choice of a particular material is dictated among other parameters by the geometry of the flow channel or other equipment and the type of glass being produced.

To ascertain the local and bulk distribution (size and/or location) of bubbles within the molten glass, and therefore the local and bulk glass density and/or glass foam density, methods and systems as described in assignee's co-pending application Ser. No. 13/752672, filed Jan. 29, 2013 may be employed, comprising an electromagnetic (EM) sensor comprising one or more EM sources and one or more EM detectors. When the terms "EM sensor" and "sensor" are used, they will be understood to mean a device having at least one EM source and at least one EM detector. In certain embodiments the EM source may be referred to as a nuclear source. The electromagnetism may be referred to as radiation, and may be in wave, particle and wave/particle formats. The EM source or sources and EM detector or detectors may provide feedback on the density gradient of the molten glass in a vessel. Based on the path the EM wave must travel, the glass density gradient within the path, the amount of radiation detected by the EM detector is a function of both the glass level as well as the range of densities of the molten foamed glass in the path of the radiation. If both the EM source and the EM detector are stationary, then measuring the glass level can provide an indication regarding how much of a change in detection could be due to a change in effective glass level, and how much is due to a change in glass density. Cobalt-60 and caesium-137 are the most suitable gamma radiation sources for radiation processing because of the relatively high energy of their gamma rays and fairly long half-life (5.27 years for cobalt-60 and 30.1 years for caesium-137). If used, the EM source may be sized appropriately depending upon the expected attenuation between the EM source and the EM detector due to distance, vessel wall thickness, vessel wall density, width of the molten foamed glass pool or stream being analyzed, molten foamed glass density, and EM detector size being utilized. Provided this information, a vendor supplying the EM source and EM detector should be able to size the EM source appropriately without undue experimentation.

Those having ordinary skill in this art will appreciate that there are many possible variations of the systems and methods described herein, and will be able to devise alternatives and improvements to those described herein that are nevertheless considered to be within the claims.

What is claimed is:

1. A system comprising:
   a submerged combustion melter (SCM) configured to form a turbulent molten mass of foamed glass by melting glass-forming materials therein, the SCM comprising a roof, a floor, a sidewall structure connecting the roof and floor, and a foamed glass outlet in the floor and/or the sidewall structure;
   a first flow channel defining a fining chamber fluidly connected to and downstream of the SCM, the first flow channel comprising at least a floor and a sidewall structure, the first flow channel comprising glass-contact refractory at least lining the floor and at least a portion of the first flow channel sidewall structure to a height sufficient to accommodate expansion of the molten mass of foamed glass as fining occurs during transit of the molten mass of foamed glass through the fining chamber, the fining separating the molten mass of foamed glass into an upper phase consisting essentially of glass foam and a lower phase consisting essentially of molten glass as the molten mass of foamed glass flows toward an end of the first flow channel distal from the SCM;

a transition section defining a passage fluidly connected to the distal end of the first flow channel, the transition section comprising a floor and a cover, the floor and cover connected by a sidewall structure, and comprising an inlet end structure and an outlet end structure, the inlet end structure comprising at least one molten glass inlet aperture and the outlet end structure comprising at least one molten glass outlet aperture, wherein all of the inlet apertures are positioned lower than a phase boundary between the upper and lower phases in the first flow channel;

wherein the floor of the transition section comprises at least one controllable aperture for flowing at least some of the molten glass by gravity therethrough upon a planned or unplanned condition.

2. The system of claim 1 wherein the passage comprises a source of heat and/or a heat sink for adjusting temperature of the molten glass as it passes through the passage.

3. The system of claim 1 comprising a second flow channel having at least a floor and a sidewall structure, the second flow channel defining a temperature homogenizing chamber, the second flow channel fluidly connected to the outlet end structure of the transition section for forming a temperature homogenized, well-fined molten glass by routing the phase consisting essentially of molten glass through the at least one outlet aperture of the outlet end structure of the transition section and into the temperature homogenizing chamber.

4. The system of claim 3 comprising one or more glass forming stations fluidly connected to a distal end of the second flow channel.

5. The system of claim 4 wherein the glass forming stations are selected from the group consisting of fiber forming spinnerets, fiberization stations, and non-glass fiber product forming stations.

6. The system of claim 4 wherein the outlet end structure of the transition section is configured to allow the molten glass to well up into an inlet end of the second flow channel.

7. The system of claim 3 wherein the first flow channel comprises a roof having a height $h_1$ above the cover of the transition section, and the second flow channel has a roof having a height $h_2$ above the cover of the transition section, wherein $h_1 > h_2$.

8. The system of claim 1 wherein 100 percent of the inlet aperture is lower than the floor of the first flow channel.

9. The system of claim 1 comprising at least one component for heating the molten glass in the transition section to maintain the molten glass in the molten state.

10. The system of claim 1 comprising at least one component for cooling the molten glass as it passes through the transition section to a temperature just above a desired glass product forming temperature.

11. The system of claim 1 wherein the transition section inlet end structure comprises a bottom angled at an angle "α" to horizontal, and the outlet end structure includes a bottom portion angled at an angle "β" to horizontal, wherein "α" and "β" are the same or different.

12. A system comprising:
a submerged combustion melter (SCM) configured to form a turbulent molten mass of foamed glass by melting glass-forming materials therein, the SCM comprising a roof, a floor, a sidewall structure connecting the roof and floor, and a foamed glass outlet in the floor and/or the sidewall structure;
a first flow channel defining a fining chamber fluidly connected to and downstream of the SCM, the first flow channel comprising at least a floor, a sidewall structure, and a roof that slants upward in the flow direction at an angle "γ" to horizontal, the first flow channel comprising glass-contact refractory at least lining the floor and at least a portion of the first flow channel sidewall structure to a height sufficient to accommodate expansion of the molten mass of foamed glass as fining occurs during transit of the molten mass of foamed glass through the fining chamber, the fining separating the molten mass of foamed glass into an upper phase consisting essentially of glass foam and a lower phase consisting essentially of molten glass as the molten mass of foamed glass flows toward an end of the first flow channel distal from the SCM; and
a transition section defining a passage fluidly connected to the distal end of the first flow channel, the transition section comprising a floor and a cover, the floor and cover connected by a sidewall structure, and comprising an inlet end structure and an outlet end structure, the inlet end structure comprising at least one molten glass inlet aperture and the outlet end structure comprising at least one molten glass outlet aperture, wherein all of the inlet apertures are positioned lower than a phase boundary between the upper and lower phases in the first flow channel.

13. A system comprising:
a submerged combustion melter (SCM) configured to form a turbulent molten mass of foamed glass by melting glass-forming materials therein, the SCM comprising a roof, a floor, a sidewall structure connecting the roof and floor, and a foamed glass outlet in the floor and/or the sidewall structure;
a first flow channel defining a fining chamber fluidly connected to and downstream of the SCM, the first flow channel comprising at least a floor and a sidewall structure, the first flow channel comprising glass-contact refractory at least lining the floor and at least a portion of the first flow channel sidewall structure to a height sufficient to accommodate expansion of the molten mass of foamed glass as fining occurs during transit of the molten mass of foamed glass through the fining chamber, the fining separating the molten mass of foamed glass into an upper phase consisting essentially of glass foam and a lower phase consisting essentially of molten glass as the molten mass of foamed glass flows toward an end of the first flow channel distal from the SCM; and
a transition section defining a passage fluidly connected to the distal end of the first flow channel, the transition section comprising a floor and a cover, the floor and cover connected by a sidewall structure, and comprising an inlet end structure and an outlet end structure, the inlet end structure comprising at least one molten glass inlet aperture and the outlet end structure comprising at least one molten glass outlet aperture, wherein all of the inlet apertures are positioned lower than a phase boundary between the upper and lower phases in the first flow channel wherein the transition section cover slants upward in the flow direction at an angle "θ" to horizontal.

14. A system comprising:
a submerged combustion melter (SCM) configured to form a turbulent molten mass of foamed glass by melting glass-forming materials therein, the SCM comprising a roof, a floor, a sidewall structure connecting the roof and floor, and a foamed glass outlet in the floor and/or the sidewall structure;
a first flow channel defining a fining chamber fluidly connected to and downstream of the SCM, the first flow channel comprising at least a floor and a sidewall structure, the first flow channel comprising glass-contact refractory at least lining the floor and at least a portion of the first flow channel sidewall structure to a height sufficient to accommodate expansion of the molten mass of foamed glass as fining occurs during transit of the molten mass of foamed glass through the fining chamber, the fining separating the molten mass of foamed glass into an upper phase consisting essentially of glass foam and a lower phase consisting essentially of molten glass as the molten mass of foamed glass flows toward an end of the first flow channel distal from the SCM;
a transition section defining a passage fluidly connected to the distal end of the first flow channel, the transition section comprising a floor and a cover, the floor and cover connected by a sidewall structure, and comprising an inlet end wall and an outlet end wall, the inlet end wall comprising at least one molten glass inlet aperture and the outlet end wall comprising at least one molten glass outlet aperture, wherein 100 percent of the inlet aperture is lower than the floor of the first flow channel; and
a second flow channel fluidly connected to the outlet end wall of the transition section and defining a temperature homogenizing chamber for forming a temperature homogenized, well-fined molten glass using the phase consisting essentially of molten glass;
wherein the floor of the transition section comprises at least one controllable aperture for flowing at least some of the molten glass by gravity therethrough upon a planned or unplanned condition.

15. The system of claim 14 wherein the passage comprises a source of heat and/or a heat sink for adjusting temperature of the molten glass as it passes through the passage.

16. The system of claim 14 comprising one or more glass forming stations fluidly connected to a distal end of the second flow channel.

17. The system of claim 16 comprising wherein the glass forming stations are selected from the group consisting of fiber forming bushings, fiberization stations, and non-glass fiber product forming stations.

18. The system of claim 14 wherein the outlet end wall of the transition section is configured to allow the molten glass to well up into an inlet end of the second flow channel.

19. The system of claim 14 comprising at least one component for heating the molten glass in the transition section to maintain the molten glass in the molten state.

20. The system of claim 14 comprising at least one component for cooling the molten glass as it passes through the transition section to a temperature just above a desired glass product forming temperature.

21. The system of claim 14 wherein the first flow channel comprises a roof having a height $h_1$ above the cover of the transition section, and the second flow channel has a roof having a height $h_2$ above the cover of the transition section, wherein $h_1 > h_2$.

22. The system of claim 14 wherein the transition section inlet end structure comprises a bottom angled at an angle "α" to horizontal, and the outlet end structure includes a bottom portion angled at an angle "β" to horizontal, wherein "α" and "β" are the same or different.

23. A system comprising:
a submerged combustion melter (SCM) configured to form a turbulent molten mass of foamed glass by melting glass-forming materials therein, the SCM comprising a roof, a floor, a sidewall structure connecting the roof and floor, and a foamed glass outlet in the floor and/or the sidewall structure;
a first flow channel defining a fining chamber fluidly connected to and downstream of the SCM, the first flow channel comprising at least a floor and a sidewall structure, the first flow channel comprising glass-contact refractory at least lining the floor and at least a portion of the first flow channel sidewall structure to a height sufficient to accommodate expansion of the molten mass of foamed glass as fining occurs during transit of the molten mass of foamed glass through the fining chamber, the fining separating the molten mass of foamed glass into an upper phase consisting essentially of glass foam and a lower phase consisting essentially of molten glass as the molten mass of foamed glass flows toward an end of the first flow channel distal from the SCM;
a transition section defining a passage fluidly connected to the distal end of the first flow channel, the transition section comprising a floor and a cover, the floor and cover connected by a sidewall structure, and comprising an inlet end wall and an outlet end wall, the inlet end wall comprising at least one molten glass inlet aperture and the outlet end wall comprising at least one molten glass outlet aperture, wherein 100 percent of the inlet aperture is lower than the floor of the first flow channel; and
a second flow channel fluidly connected to the outlet end wall of the transition section and defining a temperature homogenizing chamber for forming a temperature homogenized, well-fined molten glass using the phase consisting essentially of molten glass wherein the first flow channel comprises a roof that slants upward in the flow direction at an angle "γ" to horizontal.

24. A system comprising:
a submerged combustion melter (SCM) configured to form a turbulent molten mass of foamed glass by melting glass-forming materials therein, the SCM comprising a roof, a floor, a sidewall structure connecting the roof and floor, and a foamed glass outlet in the floor and/or the sidewall structure;
a first flow channel defining a fining chamber fluidly connected to and downstream of the SCM, the first flow channel comprising at least a floor and a sidewall structure, the first flow channel comprising glass-contact refractory at least lining the floor and at least a portion of the first flow channel sidewall structure to a height sufficient to accommodate expansion of the molten mass of foamed glass as fining occurs during transit of the molten mass of foamed glass through the fining chamber, the fining separating the molten mass of foamed glass into an upper phase consisting essentially of glass foam and a lower phase consisting essentially of molten glass as the molten mass of foamed glass flows toward an end of the first flow channel distal from the SCM;
a transition section defining a passage fluidly connected to the distal end of the first flow channel, the transition section comprising a floor and a cover, the floor and cover connected by a sidewall structure, and comprising an inlet end wall and an outlet end wall, the inlet end wall comprising at least one molten glass inlet aperture and the outlet end wall comprising at least one molten glass outlet aperture, wherein 100 percent of the inlet aperture is lower than the floor of the first flow channel; and a second flow channel fluidly connected to the outlet end wall of the transition section and defining a temperature homogenizing chamber for forming a temperature homogenized, well-fined molten glass using the phase consisting essentially of molten glass wherein the transition section cover slants upward in the flow direction at an angle "θ" to horizontal.

* * * * *